Figure 1:
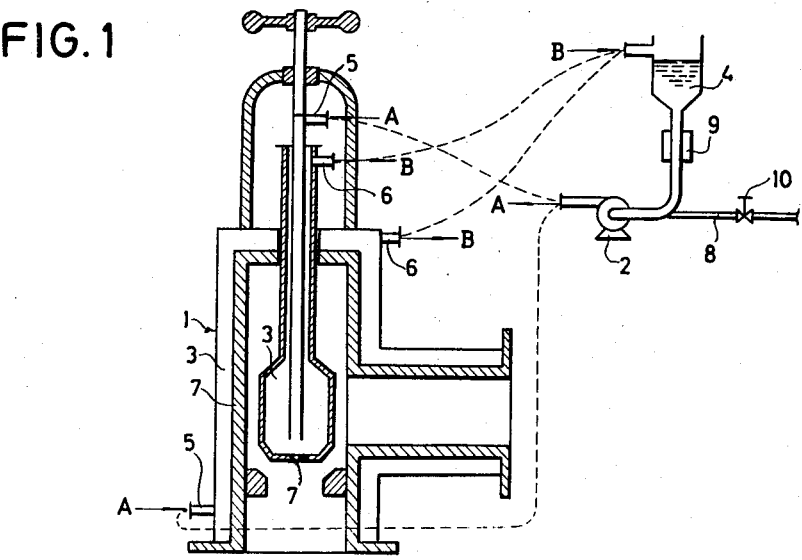

United States Patent [19]
Shiraki et al.

[11] 3,710,810
[45] Jan. 16, 1973

[54] METHOD OF COOLING CUT-OFF VALVE FOR HIGH-TEMPERATURE CORROSIVE GAS

[75] Inventors: Hiroshi Shiraki; Yoshiaki Hara; Masaaki Iguchi, all of Himeji, Japan

[73] Assignee: Nippon Steel Corporation, Tokyo, Japan

[22] Filed: Jan. 26, 1971

[21] Appl. No.: 109,785

[30] Foreign Application Priority Data

May 27, 1970 Japan .................................45/45396

[52] U.S. Cl. ................................137/1, 137/340
[51] Int. Cl. ...........................F16k 49/00, F03b 1/00
[58] Field of Search.........................137/340, 341, 1

[56] References Cited

UNITED STATES PATENTS

| | | | |
|---|---|---|---|
| 3,410,286 | 11/1968 | Satake | 137/341 X |
| 3,439,910 | 4/1969 | Regelin et al. | 137/340 X |
| 3,019,809 | 2/1962 | Ipsen et al. | 137/340 |
| 3,348,386 | 10/1967 | Forshee | 137/340 X |
| 3,414,522 | 12/1968 | Hoekstra | 137/340 X |
| 3,424,192 | 1/1969 | Rayneri | 137/340 |
| 3,448,761 | 6/1969 | Femman | 137/340 X |
| 3,534,765 | 10/1970 | King et al. | 137/341 |
| 3,548,862 | 12/1970 | Nakamura | 137/340 |
| 3,557,823 | 1/1971 | Carr et al. | 137/340 |

*Primary Examiner*—Samuel Scott
*Attorney*—Toren and McGeady

[57] ABSTRACT

A cooling method of a cut-off valve for high-temperature corrosive gas in a circulation cooling system of the valve with a cooling liquid, in which method the interior of said valve is maintained at a temperature higher than the dew point of said high-temperature gas by supplying a small quantity of fresh cooling liquid in the cooling liquid pipe-line circuit so as to hold the temperature of said cooling liquid at about its boiling point at least the exit of the cut-off valve cooling pipe-line.

5 Claims, 2 Drawing Figures

INVENTORS
HIROSHI SHIRAKI
BY YOSHIAKI HARA
MASAAKI IGUCHI
Torem and McGeady
ATTORNEYS

METHOD OF COOLING CUT-OFF VALVE FOR HIGH-TEMPERATURE CORROSIVE GAS

This invention relates to a cooling method of cut-off valve for gas at higher temperatures and corrosive for metallic materials, for example, containing hydrogen sulphide, sulphur dioxide, sulphur trioxide, carbon dioxide and ammonia together with water vapor, preventing the corrosion of the valve due to the dissolution of said gases in water produced by the condensation of said water vapor.

Cut-off valves for the gas at higher temperatures (for instance higher than 500° C), such as a cut-off valve for high-temperature gas installed in a pipe line to blow a high-temperature reducing gas into a blast furnace, or a cut-off valve for hot blast installed in a hot-blast pipe line to supply a hot blast into a blast furnace, are cooled generally by water at about room temperature. However, water condenses as water drops in the inner wall of the cut-off valve in cutting off of high-temperature gas or at the stagnant part of high-temperature gas stream, and said water drops absorb corrosive gases to form a corrosive atmosphere. Accordingly the inner wall of the cut-off valve for high-temperature corrosive gas should be made of precious anticorrosive materials.

The object of this invention is to remove said demerits in the cut-off valve for high-temperature corrosive gases. In this invention, a cooling liquid is circulated through a cooling liquid pipe-line circuit consisting of a cut-off valve cooling pipe-line included in a cut-off valve, a liquid reservoir connected to the exit of said cut-off valve cooling pipe-line, and an entrance to the cut-off valve cooling pipe-line connected to said liquid reservoir; and a small quantity of fresh cooling liquid is supplied in said cooling pipe-line circuit so as to hold the temperature of said cooling liquid at about its boiling point at least at the exit of said cut-off valve cooling pipe-line. As a result, the temperature of said valve interior can be maintained at a temperature higher than the dew point of said high-temperature corrosive gas.

It is important in the practical application of this invention that the cooling water is circulated always through the cut-off valve cooling liquid pipe-line. As the cut-off valve of this invention is loaded with relatively large heat, an evaporation cooling system is adopted. Therefore, to prevent the phenomenon of bubbling at minimum or nothing, it is necessary that the cooling water is heated to a definite temperature previously.

As for the procedure to circulate the cooling water through the cut-off valve cooled by the evaporation cooling as above-mentioned, a forced or a spontaneous circulation system may be adopted according to the conditions. Generally a spontaneous circulation system is economical in its installation cost and etc. It is desirous, however, to adopt a forced circulation system in such cases as the heat burden of the cut-off valve is large, the construction of the cut-off valve cooling pipe-line is complicated, or the installation of a stand for the water reservoir specially at a high position to obtain a definite water head is difficult.

In the following, the invention will be explained in detail according to the drawings.

FIG. 1 is the explanatory drawing of the section of a cut-off valve to perform this invention by the forced circulation system.

At the cut-off valve 1 to perform this invention, a high-temperature gas is cooled with a cooling liquid at a temperature nearly its boiling point (at least at the exit 6 of the cut-off valve cooling pipe-line). The boiling point of the cooling liquid practically applicable is higher than about 100° C, and the dew point of the industrial gas is lower than 100° C.

The greater part of the cooling liquid in this invention, heated nearly to its boiling point, is circulated through a cut-off valve cooling pipe-line 3 and a liquid reservoir 4 by means of a pump 2 in the direction of the arrow signs A and B. Namely, the cooling liquid, heated nearly to its boiling point, passes in the direction of the arrow sign A by means of the pump 2 and enters in the cut-off valve cooling pipe-line through its entrance 5, where it is heated to its boiling point by the heat from the wall 7, and a part of the cooling liquid is evaporated to form gas bubbles (gas-water ratio is 10 – 50 percent). The cooling fluid containing gas bubbles passes then through the exit 6 of the cut-off valve cooling pipe-line in the liquid reservoir 4, where the gas is separated.

When the liquid level in the liquid reservoir 4 is lowered by the loss of a part of the cooling liquid in the form of gas and liquid, the amount of the cooling liquid supplied from the supply pipe-line 8 under a constant pressure (corresponding to the normal head of said liquid level) increases, and said liquid level restors its normal position. The amount of supply liquid may be controlled by overflowing a small amount of the liquid at the reservoir 4, or by the fluid amount controlling valve 10 regulated by the feed-back of the signal at the liquid level.

The heater 9 is used only when the preliminary heating is needed, for instance, when the operation is started, or when the temperature of high-temperature gas is lowered owing to a long hours' cutting-off of the gas.

Figure 2:
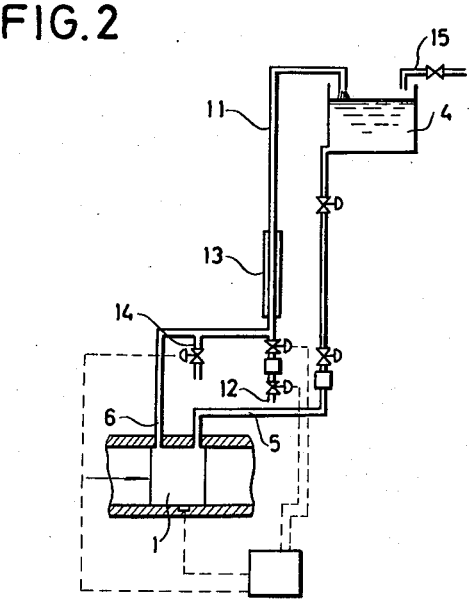

FIG. 2 shows another embodiment of this invention, in which the cooling water is circulated through the cut-off valve spontaneously.

A constant amount of cooling water is circulated through the cut-off valve cooling pipe-line spontaneously by utilizing the water head of the liquid reservoir 4, and the cooling liquid cools the cut-off valve 1 at a temperature nearly to its boiling point, holding the temperature of the interior of the valve above the dew point of high-temperature corrosive gas.

In the case of said spontaneous circulation system of the cooling liquid, it is difficult to lift the cooling liquid, exhausted from the exit 6 of the cooling pipe-line in the valve as it stands, in the exhaust pipe-line 11 up to the water level in the liquid reservoir 4. Therefore, in order to flow the exhaust cooling liquid spontaneously, the amount of gas bubbles contained in the cooling liquid in the exhaust pipe-line 11 is forced to increase by a suitable procedure in this invention. Then the mean density of the cooling fluid consisting of cooling liquid and gas bubbles becomes small, and the cooling fluid rises up in the exhaust pipe-line spontaneously. Examples of the procedure to increase gas bubbles in the exhaust cooling liquid are as follows.

The one is to introduce a gas such as nitrogen, having neither corrosive nor corrosion accelerating action for the pipe material from its inlet 12 in the exhaust cooling system to lift up the exhaust fluid. Water vapor at a relatively high temperature, which forms gas bubbles to some extent when it is introduced in the cooling water, may also be adopted. By introducing said gases in the exhaust cooling system, gas bubbles are produced in the cooling water, the mean density of the cooling fluid becomes small, and the exhaust fluid is lifted up to the reservoir.

Another procedure is to heat cooling water in the exhaust cooling system by a heater 13, which is heated with the use of electric energy, steam heat and others, to produce gas bubbles.

In a further procedure, a part of cooling liquid in the exhaust cooling system is branched from an exhaust pipe 14, heated vigorously avoiding the bubbling to produce water vapor, and the water vapor is returned as gas bubbles to the system to circulate the exhaust cooling fluid. High-temperature gas, for instance in the cut-off value 1, may be utilized for the heating of the cooling liquid.

The loss of cooling liquid during circulation is from a supply pipe-line 15 to the liquid reservoir 4. The cooling liquid is circulated as above-mentioned in this invention.

Therefore, the temperature of cooling liquid at the outside of the wall 7 (cooling liquid side) is maintained at its boiling point, and consequently the temperature of the gas at the inside of the wall 7 does not reach by no means to its dew point. The heat conduction film at the outside of the wall 7 is disturbed by gas bubbles, with the aid of a proper adjustment of the amount of supply water, making the substantial heat conduction film very thin. The cooling efficiency in this invention is superior to that of the cold water cooling.

An example of this invention in using a forced circulation system will be compared with the usual cold water cooling method in the following.

A cut-off valve with a caliber of 200 mm, whose inside wall was made of steel (carbon steel) plate, was tested for the cut-off of a high temperature gas circuit at 1500° C. The gas was obtained by the cracking of heavy oil (common S heavy oil, S 2 percent). Cooling liquid was soft water. The results were as in the following table.

|  | Usual method | This invention |
| --- | --- | --- |
| Temperature of cooling liquid pipe line at the entrance of the valve | 10°–30°C (mean 20°C) | 80°–100°C |
| Temperature of cooling liquid pipe line at the exit of the valve | 30°–50°C | 100°–120°C |
| Flow amount of cooling liquid in the valve | 5 t/hr. | 1.7–0.4 t/hr. |
| Gas-water ratio (in exhaust cooling liquid) | 0% | 10–50% |
| Cooling amount | 120,000 Kcal/hr. | 120,000 Kcal/hr. |
| Life of the valve | Half a year | More than 2 years |

As it is obvious from the results, the principal merits of this invention are: the cooling can be done effectively maintaining the temperature of the gas in the valve below its dew point, and therefore the life of the cut-off valve (wall 7) is long, or the valve can be constructed with a cheap material, and further the amount of cooling water can remarkably be cut down.

We claim:
1. A method of cooling a cut-off valve for high-temperature corrosive gas, said cooling being effected by evaporation of a coolant in a spontaneous circulation cooling system, comprising the step of decreasing the density of the coolant flowing in the exhaust conduit of the cooling system for the cut-off valve by increasing the volume of bubbles in said coolant thereby to generate spontaneous circulation of the coolant in the circulation cooling system.

2. A method according to claim 1 wherein a gas is introduced into said coolant in order to increase the bubbles therein.

3. A method according to claim 1 wherein steam is introduced into the coolant in order to increase the bubbles therein.

4. A method according to claim 1 wherein nitrogen gas is introduced into the coolant in order to increase the bubbles therein.

5. A method according to claim 1 wherein the coolant is heated in order to increase the bubbles therein.

* * * * *